United States Patent
Mysore Shantamurthy et al.

(10) Patent No.: US 11,379,212 B2
(45) Date of Patent: Jul. 5, 2022

(54) SYSTEMS AND METHODS FOR DISAGGREGATING SYSTEM FIRMWARE CONFIGURATION DATA INTO A MANAGEMENT SUBSYSTEM FOR SEAMLESS UPDATES

(71) Applicant: Microsoft Technology Licensing, LLC, Redmond, WA (US)

(72) Inventors: Ravi Mysore Shantamurthy, Bothell, WA (US); Muhammad Ashfaq Ahmed, Redmond, WA (US); Mallik Bulusu, Bellevue, WA (US); Neeraj Ladkani, Bothell, WA (US); Sagar Dharia, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/008,310

(22) Filed: Aug. 31, 2020

(65) Prior Publication Data
US 2022/0066766 A1 Mar. 3, 2022

(51) Int. Cl.
*G06F 8/65* (2018.01)
*G06F 9/455* (2018.01)
(Continued)

(52) U.S. Cl.
CPC ............. *G06F 8/65* (2013.01); *G06F 9/4401* (2013.01); *G06F 9/45558* (2013.01); *G06F 16/90335* (2019.01)

(58) Field of Classification Search
CPC .... G06F 8/65; G06F 16/90335; G06F 9/4401; G06F 9/45558
See application file for complete search history.

(56) References Cited

U.S. PATENT DOCUMENTS 7,376,870 B2 * 5/2008 Kataria ................ G06F 8/65
714/3
7,769,990 B1 * 8/2010 Okcu ................... G06F 11/1469
713/1
(Continued)

OTHER PUBLICATIONS

Korpelin, "Boot Loader and Firmware Update Protocol for Embedded Devices", May 2018, Turku University of Applied Sciences (Year: 2018).*

(Continued)

*Primary Examiner* — Wei Y Zhen
*Assistant Examiner* — Junchun Wu
(74) *Attorney, Agent, or Firm* — Ray Quinney & Nebeker P.C; James Bullough

(57) ABSTRACT

While booting a host computing device on a cloud computing system, system firmware (such as Basic Input/Output System (BIOS) or Unified Extensible Firmware Interface (UEFI)) sends a query to a management subsystem (such as a baseboard management controller (BMC)) for updated configuration data used during a boot of the host computing device. The management subsystem sends the updated configuration data to the system firmware, and boot instructions in the system firmware compare the updated configuration data with configuration data stored on the host computing device. If the respective configuration data match, the boot instructions continue with booting the host computing device. If the configuration data do not match, then the boot instructions update the stored configuration data with the updated configuration data and then proceed to boot the host computing device.

20 Claims, 9 Drawing Sheets

(51) Int. Cl.
*G06F 9/4401* (2018.01)
*G06F 16/903* (2019.01)

(56) References Cited

U.S. PATENT DOCUMENTS

| | | | | |
|---|---|---|---|---|
| 8,386,759 B1* | 2/2013 | Duwel | ................ | G06F 9/4401 713/2 |
| 9,110,678 B1 | 8/2015 | Chan et al. | | |
| 9,553,766 B2* | 1/2017 | Janke | ................ | H04L 67/34 |
| 9,632,806 B1 | 4/2017 | Righi | | |
| 10,324,706 B1* | 6/2019 | Schrader | ................ | G06F 9/4416 |
| 10,635,820 B1* | 4/2020 | Gallinghouse | ........ | G06F 21/575 |
| 2002/0083331 A1* | 6/2002 | Krumel | ................ | H04L 63/14 726/3 |
| 2004/0230963 A1* | 11/2004 | Rothman | ................ | G06F 8/65 717/168 |
| 2008/0209193 A1* | 8/2008 | Zhang | ................ | G06F 8/60 713/1 |
| 2010/0325404 A1* | 12/2010 | Aldereguia | ............... | G06F 1/24 713/2 |
| 2011/0154007 A1* | 6/2011 | Juvonen | ................ | G06F 1/3212 713/2 |
| 2011/0296160 A1* | 12/2011 | Hatasaki | ............... | G06F 9/4401 713/2 |
| 2013/0262849 A1 | 10/2013 | Redheendran et al. | | |
| 2016/0092203 A1* | 3/2016 | Filali-Adib | ............ | G06F 8/656 717/171 |
| 2016/0210163 A1* | 7/2016 | McSorely | ............ | G06F 9/4401 |
| 2017/0244596 A1* | 8/2017 | Chen | ................... | H04L 12/1407 |
| 2018/0365426 A1* | 12/2018 | Callaghan | ............. | G06F 21/575 |
| 2020/0073652 A1 | 3/2020 | Chen | | |
| 2020/0136901 A1* | 4/2020 | Ballard | ............... | G06F 9/45558 |
| 2020/0326956 A1* | 10/2020 | Raayman | ............. | G06F 9/4416 |
| 2021/0216304 A1* | 7/2021 | Marino | ................... | H04L 67/34 |

OTHER PUBLICATIONS

Carlsson et al., "Configuration Service in Cloud based Automation Systems", 2016, IEEE (Year: 2016).*
Brightwell et al., "Massively parallel computing using commodity components", Nov. 1998, Elsevier (Year: 1998).*
Agyemang et al., "Resource-oriented Architecture toward Efficient Device Management and Service Enablement", 2017, IEEE (Year: 2017).*
Siddiqui et al., "Secure Boot for Reconfigurable Architectures", Aug. 2020, www.mdpi.com/journal/cryptography (Year: 2020).*
"International Search Report and Written Opinion Issued in PCT Application No. PCT/US21/039473", dated Oct. 13, 2021, 13 Pages.

* cited by examiner

SYSTEMS AND METHODS FOR DISAGGREGATING SYSTEM FIRMWARE CONFIGURATION DATA INTO A MANAGEMENT SUBSYSTEM FOR SEAMLESS UPDATES

CROSS-REFERENCE TO RELATED APPLICATIONS

N/A

BACKGROUND

Cloud computing is the delivery of computing services (e.g., servers, storage, databases, networking, software, analytics) over the Internet. Broadly speaking, a cloud computing system includes two sections, a front end and a back end, that are in communication with one another via the Internet. The front end includes the interface that users encounter through a client device. The back end includes the resources that deliver cloud-computing services, including processors, memory, storage, and networking hardware.

The back end of a cloud computing system typically includes one or more datacenters, which may be located in different geographical areas. Each datacenter typically includes a large number (e.g., hundreds or thousands) of servers. These servers may be referred to as host computing devices. Each host computing device can be used to run one or more virtual machines. In this context, the term "host computing device" refers to a physical computer system, while the term "virtual machine" refers to an emulation of a computer system on a host computing device.

The system firmware within a host computing device serves as an interface between the hardware and the operating system of the host device, and it is responsible for bringing silicon features into light as well as enabling firmware assisted means for error handling and containment. Some examples of system firmware include the Unified Extensible Firmware Interface (UEFI) and the Basic Input/Output System (BIOS).

The system firmware within a host computing device includes boot instructions for booting the host device. As a host device is being booted, the boot instructions perform various tasks such as initializing the hardware of the host device and enabling means for error handling and containment. The boot instructions can utilize configuration data for performing tasks that configure various aspects of the host device. Once these tasks have been completed, the boot instructions then boot the operating system of the host device.

Different host computing devices in a cloud computing system can be specifically configured for different purposes. As a simple example, some host devices can be configured as compute nodes, and other host devices can be configured as storage nodes. Host devices that are configured as compute nodes can be specifically configured for processing-related tasks, whereas host devices that are configured as storage nodes can be specifically configured for storage-related tasks. Host computing devices that are configured for different purposes (e.g., compute nodes and storage nodes) typically utilize different configuration data as they are booted.

With current approaches, when a system administrator wants to make a change to a host computing device, such as a change in operational mode (e.g., to repurpose from a storage node to a compute node or vice versa), the host device needs to be completely reimaged with new system firmware. Reimaging host devices in this way is time consuming and can make it difficult to repurpose or otherwise change aspects of host computing devices.

SUMMARY

A system for efficiently updating configuration data utilized by a host computing device during a boot cycle is disclosed. The system includes one or more processors and memory in electronic communication with the one or more processors. The system also includes first configuration data stored in the memory. The first configuration data is designed to configure the host computing device for a first device configuration. System firmware is also stored in the memory. The system firmware includes boot instructions that utilize the first configuration data. The boot instructions are executable by the one or more processors to send a first query to a management subsystem during a first boot cycle of the host computing device. The first query requests any updates to the first configuration data. The boot instructions are also executable by the one or more processors to receive second configuration data from the management subsystem during the first boot cycle. The second configuration data is designed to configure the host computing device for a second device configuration. The second configuration data includes at least one new boot policy that is not included in the first configuration data. The boot instructions are also executable by the one or more processors to execute at least one new boot flow during the first boot cycle. The at least one new boot flow is associated with the second device configuration. The at least one new boot flow is based on the at least one new boot policy in the second configuration data.

In some embodiments, the host computing device can be part of a cloud computing system that is operated by a cloud computing provider. The first device configuration can be associated with a first virtual machine (VM) profile offered by the cloud computing provider. The second device configuration can be associated with a second VM profile offered by the cloud computing provider. The second VM profile can be different from the first VM profile.

The host computing device can additionally include non-volatile memory. The boot instructions can be additionally executable by the one or more processors to save the second configuration data in the non-volatile memory. The boot instructions can be additionally executable by the one or more processors to send a second query to the management subsystem during a second boot cycle of the host computing device. The second boot cycle can occur subsequent to the first boot cycle. The second query can request any updates to the second configuration data.

In some embodiments, the boot instructions can be additionally executable by the one or more processors to determine, based at least in part on information received from the management subsystem and the second configuration data stored in the non-volatile memory, that no updates to the second configuration data are available from the management subsystem. The boot instructions can be additionally executable by the one or more processors to proceed with execution of the second boot cycle without obtaining any new configuration data from the management subsystem.

In some embodiments, the boot instructions can be additionally executable by the one or more processors to determine, based at least in part on information received from the management subsystem and the second configuration data stored in the non-volatile memory, that new configuration data is available from the management subsystem. The boot instructions can be additionally executable by the one or more processors to receive the new configuration data from the management subsystem during the second boot cycle. The new configuration data can include an additional boot policy that is not included in the first configuration data or the second configuration data.

In some embodiments, the management subsystem can include a management controller that is included within the host computing device.

In some embodiments, the management subsystem can include at least one server that is separate from the host computing device and in electronic communication with the host computing device.

The boot instructions can be additionally executable by the one or more processors to translate the second configuration data into human interface infrastructure (HII) data and to apply the HII data to a system firmware setup menu.

A management subsystem that facilitates efficient updating of configuration data utilized by a host computing device during a boot process is also disclosed. The management subsystem includes one or more processors and memory in electronic communication with the one or more processors. The management subsystem also includes instructions that are stored in the memory and executable by the one or more processors to receive updated configuration data corresponding to the host computing device. The instructions are also executable by the one or more processors to receive a first query from the host computing device during a first boot cycle of the host computing device. The first query requests any updates to the configuration data being utilized by system firmware of the host computing device. The configuration data is designed to configure the host computing device for a first device configuration. The instructions are also executable by the one or more processors to provide the updated configuration data to the host computing device in response to the first query. The management subsystem provides the updated configuration data to the host computing device during the first boot cycle. The updated configuration data is designed to configure the host computing device for a second device configuration. The updated configuration data includes at least one new boot policy that is not included in the configuration data being utilized by the system firmware of the host computing device.

In some embodiments, the host computing device can be part of a cloud computing system that is operated by a cloud computing provider. The first device configuration can be associated with a first virtual machine (VM) profile offered by the cloud computing provider. The second device configuration can be associated with a second VM profile offered by the cloud computing provider. The second VM profile can be different from the first VM profile.

In some embodiments, the host computing device is part of a cloud computing system, and the updated configuration data can be received from a system administrator associated with the cloud computing system.

The instructions can be additionally executable by the one or more processors to receive a second query from the host computing device during a second boot cycle of the host computing device. The second boot cycle can occur subsequent to the first boot cycle. The second query can request any additional updates to the updated configuration data.

In some embodiments, the instructions can be additionally executable by the one or more processors to provide information to the host computing device indicating that no new configuration data is available from the management subsystem. The host computing device can proceed with execution of the second boot cycle without obtaining any new configuration data from the management subsystem.

In some embodiments, the instructions can be additionally executable by the one or more processors to receive additional updated configuration data corresponding to the host computing device and to provide new configuration data to the host computing device in response to the second query. The management subsystem can provide the new configuration data to the host computing device during the second boot cycle. The new configuration data can include an additional boot policy that is not included in the configuration data or the updated configuration data.

In some embodiments, the management subsystem can include a management controller that is included within the host computing device.

In some embodiments, the management subsystem can include at least one server that is separate from the host computing device and in electronic communication with the host computing device.

A method for efficiently updating configuration data utilized by a host computing device during a boot process is also disclosed. The method can be implemented by boot instructions within system firmware of the host computing device. The method can include sending a first query to a management subsystem during a first boot cycle of the host computing device. The configuration data can be designed to configure the host computing device for a first device configuration. The first query can request any updates to the configuration data. The method can also include receiving updated configuration data from the management subsystem during the first boot cycle. The updated configuration data can be designed to configure the host computing device for a second device configuration. The updated configuration data can include at least one new boot policy that is not included in the configuration data. The method can also include executing at least one new boot flow during the first boot cycle. The at least one new boot flow can be associated with the second device configuration. The at least one new boot flow can be based on the at least one new boot policy in the updated configuration data.

In some embodiments, the host computing device can be part of a cloud computing system that is operated by a cloud computing provider. The first device configuration can be associated with a first virtual machine (VM) profile offered by the cloud computing provider. The second device configuration can be associated with a second VM profile offered by the cloud computing provider. The second VM profile can be different from the first VM profile.

In some embodiments, the method can additionally include saving the updated configuration data in non-volatile memory of the host computing device.

The method can also include sending a second query to the management subsystem during a second boot cycle of the host computing device. The second boot cycle can occur subsequent to the first boot cycle. The second query can request any additional updates to the configuration data.

In some embodiments, the method can also include determining, based at least in part on information received from the management subsystem and the updated configuration data stored in the non-volatile memory, that no additional updates to the configuration data are available from the management subsystem. The method can also include proceeding with execution of the second boot cycle without obtaining any new configuration data from the management subsystem.

In some embodiments, the method can also include determining, based at least in part on information received from the management subsystem and the updated configuration data stored in the non-volatile memory, that an additional update to the configuration data is available from the management subsystem. The method can also include receiving the additional update to the configuration data from the management subsystem during the second boot cycle. The additional update to the configuration data can include an additional boot policy that is not included in the configuration data or the updated configuration data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
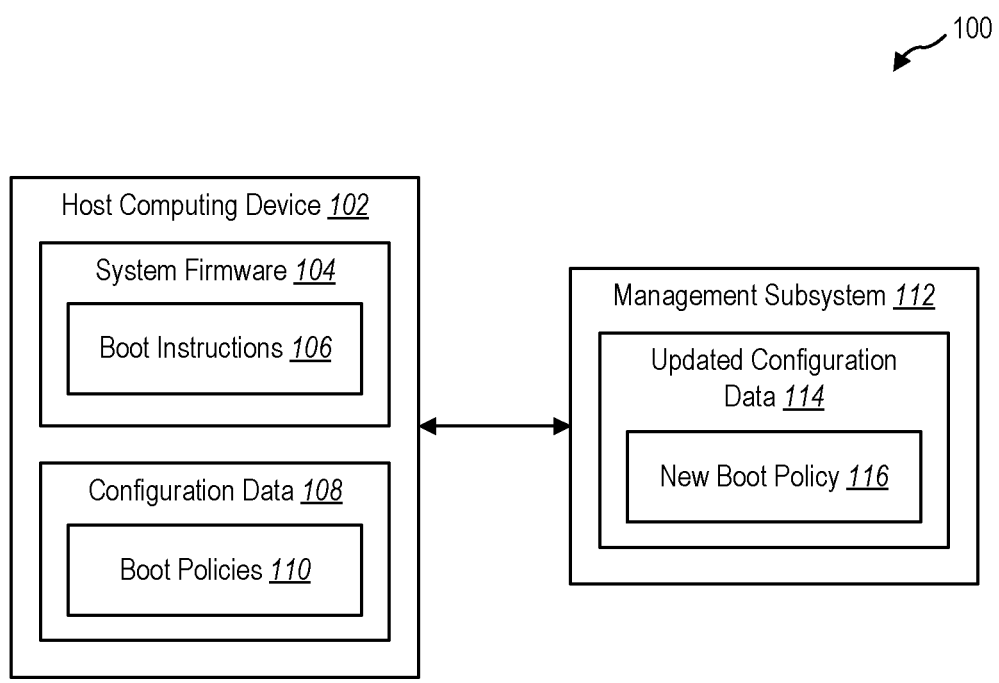
FIG. 1 illustrates an example of a cloud computing system in which the techniques disclosed herein can be utilized.

The present disclosure is generally related to techniques for updating configuration data utilized by system firmware of a host computing device in a cloud computing system. In accordance with the present disclosure, the boot instructions within the system firmware can be configured to query a management subsystem for updates to configuration data. The management subsystem can provide the boot instructions with updated configuration data that is specific to the desired configuration of the host device.

As noted above, with current approaches it is difficult to update the configuration data utilized by system firmware of a host device. When a system administrator wants to change the configuration data, the host device needs to be completely reimaged with new system firmware. This is because configuration data utilized by the system firmware is currently included as part of the system firmware image. In accordance with the present disclosure, however, it is not necessary to reimage the host device with new system firmware in order to update the configuration data. Instead, the updated configuration data can be provided to a management subsystem, and the boot instructions within the system firmware can receive the updated configuration data by querying the management subsystem as the host device is being booted. Thus, the techniques disclosed herein facilitate offloading of configuration data utilized by system firmware into a management subsystem, thereby enabling seamless and impactless updates of such configuration data. Stated another way, the techniques disclosed herein enable disaggregation of configuration data from the system firmware image that is used to image host computing devices. This allows the configuration data for a particular host device (or a group of host devices) to be updated without requiring the host device(s) to be completely reimaged. In other words, configuration data can be updated independently, without changes to the system firmware.

The techniques disclosed herein can provide several important benefits for cloud computing providers that offer cloud computing services to customers. Some of these benefits can be related to the types of cloud computing services that are offered to customers.

In a cloud computing system, host computing devices can be configured for different purposes. Host computing devices that are configured for different purposes may use different configuration data during a boot process. The techniques disclosed herein enable the configuration data utilized by host computing devices to be efficiently updated, thereby making it possible to quickly and easily reconfigure host computing devices for different purposes. In the discussion that follows, the term "device configuration" can refer to a particular combination of software and/or hardware resources within a host computing device. The configuration data utilized by a particular host computing device can cause the computer system to be configured in accordance with a particular device configuration. Changing the configuration data utilized by a particular host computing device can cause the device configuration associated with a particular host computing device to be changed. In some situations, a device configuration may alternatively be referred to as a server configuration and/or an operational mode.

There can be many different aspects of a device configuration. Some aspects of a device configuration associated with a particular host computing device can be related to the types of virtual machines that run on the host computing device. For example, a cloud computing provider can allow customers to purchase the use of virtual machines. As discussed above, a virtual machine is an emulation of a computer system that runs on a host computing device. A cloud computing provider can offer different types of virtual machines (VMs) to customers. As a simple example, some VMs may emphasize processing capabilities, while other VMs may emphasize storage capabilities. Of course, many more complex varieties of VMs can be offered by a cloud computing provider.

In the discussion that follows, a particular type of VM may be described as having a particular VM profile. In the context of a cloud computing system, the term "VM profile" can refer to a particular combination of processing resources and memory resources utilized by a particular VM. Also, a VM profile can be considered to be one aspect of a device configuration. Thus, in the simple example described above, VMs that emphasize processing capabilities may be associated with a particular device configuration and VM profile, while VMs that emphasize storage capabilities may be associated with a different device configuration and VM profile.

Some cloud computing providers characterize different types of VMs as having different stock-keeping units, or SKUs. A SKU can be considered to be one example of a VM profile. In some situations, a SKU can also be considered to be an example of a device configuration.

In some cloud computing systems, host computing devices can be specifically configured to run VMs associated with particular VM profiles. For instance, continuing with the simple example described above, some host computing devices can be configured in accordance with a device configuration that is designed to run VMs associated with processing-intensive VM profiles, whereas other host computing devices can be configured in accordance with a device configuration that is designed to run VMs associated with storage-intensive VM profiles.

To boot a host computing device, the system firmware may execute a "boot cycle." A boot cycle may begin when the host computing device is turned on. The boot cycle may then perform operations related to setting up the host computing device. The boot cycle may then set up the host computing device in a specific device configuration. The system firmware includes boot instructions that utilize configuration data to configure the host computing device. The boot cycle ends when control of the host computing device is passed from the system firmware to the operating system.

The configuration data that is utilized as a host device is being booted is often fine-tuned for different device configurations. For example, the configuration data utilized to boot a host computing device that runs VMs associated with one type of VM profile (e.g., a VM profile that emphasizes processing capabilities) can be different from the configuration data that is utilized to boot a host computing device that runs VMs associated with a different type of VM profile (e.g., a VM profile that emphasizes storage capabilities). However, the use of configuration data is not limited to VM profiles. Configuration data can affect any aspect of a device configuration.

The configuration data can include boot policies, which can in turn determine boot flows (i.e., operations that are performed during a boot cycle). In some embodiments, "boot policies" may refer to instructions that determine or define one or more boot flows. A "boot flow" may refer to the sequence of operations (e.g., the code) followed by the boot instructions to configure the host computing device in a specific configuration. For example, a boot policy may be that the host computing device is set up in a computational configuration. To set up the host computing device in the computational configuration, the boot policy may instruct the boot instructions to follow a boot flow utilized to set up the computational configuration on the host computing device. Similarly, a boot policy may be that the host computing device is set up in a storage configuration. To set up the host computing device in the storage configuration, the boot policy may instruct the boot instructions to follow a boot flow utilized to set up the storage configuration on the host computing device. Thus, by changing the boot policies, the device configuration or operational mode of the host computing device may be changed (e.g., the host computing device may be repurposed).

In some implementations, a cloud computing provider can use a single system firmware image for all available device configurations. In other words, all host computing devices can be imaged with the same system firmware image. However, the boot flows can be unique to each device configuration as determined by the state flags and data included in the configuration data.

The techniques disclosed herein can enhance a cloud computing provider's ability to configure host computing devices for different device configurations because they allow the configuration data for a particular host computing device (or group of host computing devices) to be quickly and easily updated. Consider an example in which a host computing device is configured for a particular device configuration (e.g., a device configuration that is designed for VMs associated with a particular VM profile), and a system administrator wants to repurpose that host device for a different device configuration (e.g., a device configuration that is designed for VMs associated with a different VM profile). With current approaches, this would require the host device to be completely reimaged with a new system firmware image. This is because, as discussed above, configuration data utilized by system firmware is currently included as part of the system firmware image. Thus, any updates to such configuration data would require an update to the entire system firmware image. With the techniques disclosed herein, however, repurposing a host device for a different device configuration would not require the host device to be completely reimaged with a new system firmware image. This is because the techniques disclosed herein enable disaggregation of configuration data from the system firmware image that is used to image host computing devices. In accordance with the present disclosure, the updates to the configuration data can be communicated to a management subsystem, and the boot instructions can receive the updated configuration data by querying the management subsystem as the host device is being booted.

The boot instructions can be configured to query a management subsystem for updated configuration data during each boot. When the management subsystem has updated configuration data, the management subsystem can provide the updated configuration data in response to the query. In some embodiments, the management subsystem can provide a raw byte stream of data, and the boot instructions can parse the raw byte stream of data to determine the particular configuration data that should be applied. In some embodiments, the configuration data can include boot policies related to specific boot flows that configure a host computing device for a particular device configuration (e.g., a device configuration for running a VM associated with a specific VM profile). The boot instructions can modify the boot flows that are executed based on the updated configuration data that is received. In other words, the updated configuration data can cause changes to the boot flows that are executed during the boot cycle.

In some embodiments, the boot instructions can save the updated configuration data in non-volatile memory (e.g., NVRAM) so that the updated configuration data does not have to be redownloaded from the management subsystem during the next boot cycle. During a particular boot cycle, the boot instructions can determine whether the management subsystem has updated configuration data that should be downloaded. For example, the boot instructions can compare the configuration data provided by the management subsystem with the configuration data currently utilized by the boot instructions. If it is determined that the management subsystem has updated configuration data that should be downloaded, the boot instructions can download and apply the updated configuration data. On the other hand, if it is determined that there is not any updated configuration data, then there is no need to download any new configuration data from the management subsystem. Thus, storing the updated configuration data in non-volatile memory can save time because the updated configuration data does not have to be downloaded from the management subsystem more than once.

In some embodiments, the boot instructions can translate the updated configuration data into human interface infrastructure (HII) data that can then be applied to the system firmware setup as defaults.

In some embodiments, the updated configuration data provided by the management subsystem can be represented in a particular format (e.g., JSON) that can be parsed and interpreted by the boot instructions. The configuration data can be signed using a particular signing infrastructure, which may be similar to the signing infrastructure used for authentication of the system firmware image.

As used herein, "boot instructions" may refer to any system-level code used while starting or booting a host computing device. Boot instructions may be included as part of system firmware, such as Basic Input/Output System (BIOS), Unified Extensible Firmware Interface (UEFI), F-code, and other types of firmware that can be utilized by host computing devices.

As used herein, a "management subsystem" refers to any component or combination of components that is configured to perform management operations with respect to one or more host computing devices. As discussed above, the boot instructions on a particular host computing device can query a management subsystem as the host device is being booted. In some embodiments, the management subsystem can be located on the host computing device itself. For example, the management subsystem can be a baseboard management controller (BMC) or other type of auxiliary service processor located on the host device. Alternatively, the management subsystem can include one or more other computing devices or systems that are separate from the host computing device. For example, the management subsystem can include one or more servers that are separate from the host computing device.

As noted above, a management subsystem can include a specialized microcontroller, such as a baseboard management controller (BMC) or other type of auxiliary service processor. A BMC is a specialized microcontroller that can be embedded on the motherboard of a host computing device. It can be useful for BMCs to be included in host computing devices within a cloud computing system because they allow system administrators to perform various tasks remotely. For example, a system administrator can remotely communicate with a BMC to take corrective actions, such as resetting or power cycling a host computing device. In accordance with the present disclosure, a BMC can also be configured to provide updated configuration data to a host computing device as the host device is being booted.

FIG. 1 illustrates aspects of a cloud computing system 100 according to at least one embodiment of the present disclosure. The cloud computing system 100 includes a host computing device 102. The host computing device 102 includes a physical computer system with hardware resources, including processing resources, memory resources, and other hardware resources of a physical computer system. For simplicity, only one host computing device 102 is shown in FIG. 1. However, a cloud computing system 100 typically includes a large number of host computing devices.

The host computing device 102 may be configured with a device configuration to perform specialized tasks. The device configuration may be determined by the allocation and setup of hardware and/or software resources. As discussed above, some examples of device configurations include a computational configuration for performing computationally intensive processes and a storage configuration for performing storage intensive processes. If the host computing device 102 is configured for the computational configuration, the host computing device 102 may be referred to as a compute node. If the host computing device 102 is configured for the storage configuration, the host computing device 102 may be referred to as a storage node. While two simple examples of device configurations are provided, it should be understood that many other types of device configurations are possible, depending on the intended use of the host computing device 102.

In some embodiments, a host computing device 102 configured in accordance with a computational configuration may be configured to run VMs associated with a processing-intensive VM profile, and a host computing device 102 configured in accordance with a storage configuration may be configured to run VMs associated with a storage-intensive VM profile.

The host computing device 102 may include system firmware 104 that serves as an interface between the hardware resources and the operating system of the host computing device 102. The system firmware 104 helps to initiate silicon features of the hardware resources, and may include systems for error handling and containment. Some examples of system firmware 104 include the Unified Extensible Firmware Interface (UEFI) and the Basic Input/Output System (BIOS).

The system firmware 104 includes boot instructions 106, which may include the instructions to initialize the hardware resources and boot the operating system of the host computing device 102. The boot instructions 106 may use configuration data 108 to boot a host computing device 102 with a particular device configuration. There can be many different types of unique device configurations. Thus, the boot instructions 106 used to boot the host computing device 102 associated with a particular device configuration can utilize configuration data 108 specific to that device configuration.

The configuration data 108 may include one or more boot policies 110. The boot policies 110 may determine boot flows used by the boot instructions 106 during a boot cycle. The boot flows may be the specific operations that set up a particular host computing device 102 for a particular device configuration. Thus, a change to the configuration data 108, including a change to the boot policies 110, may change the device configuration of a host computing device 102 when the boot instructions 106 boot the host computing device 102.

The cloud computing system 100 may include a management subsystem 112 in communication with the host computing device 102. The management subsystem 112 may receive updated configuration data 114 for the host computing device 102 from a system administrator. The updated configuration data 114 may include a new boot policy 116, which may determine a new boot flow.

In the embodiment shown in FIG. 1, the management subsystem 112 is shown separately from the host computing device 102. For example, the management subsystem 112 can include one or more servers (or other types of computing devices) that are separate from the host computing device 102. Alternatively, in some embodiments the management subsystem 112 can be included as part of the host computing device 102. For example, the management subsystem 112 can be a baseboard management controller (BMC) or other type of auxiliary service processor located on the host computing device 102.

In some embodiments, an administrator of the cloud computing system 100 may desire to change (e.g., repurpose) the configuration of the host computing device 102 and the associated device configuration. For example, suppose that the original configuration data 108 of the host computing device 102 is designed to configure the host computing device 102 for a first type of device configuration (e.g., to run VMs associated with a first VM profile). To change the host computing device 102 to a second type of device configuration, the system administrator may identify one or more elements of the configuration data 108 and the boot policies 110 to change with updated configuration data 114 and a new boot policy 116 not included in the original boot policies 110. The system administrator may then provide the management subsystem 112 with the updated configuration data 114 and the new boot policy 116 that is designed to configure the host computing device 102 for a second type of device configuration (e.g., to run VMs associated with a second VM profile).

During a boot cycle of the host computing device 102, the boot instructions 106 in the system firmware 104 may send a query to the management subsystem 112 for the updated configuration data 114. The management subsystem 112 may transmit the updated configuration data 114 to the host computing device 102. The boot instructions 106 may then use the updated configuration data 114 to complete the boot cycle and boot the host computing device 102.

When the boot instructions 106 receive the updated configuration data 114, the boot instructions 106 may modify and/or replace the existing the boot flows based on the new boot flow(s) associated with the new boot policy 116. While performing the remainder of the boot cycle, the boot instructions 106 may execute the new boot flow(s). In this manner, the host computing device 102 may be booted with a different device configuration.

As noted above, with current approaches the configuration data utilized by the system firmware is currently included as part of the system firmware image. Therefore, when a system administrator wants to change the configuration data, the host device needs to be completely reimaged with new system firmware. In accordance with the present disclosure, however, it is not necessary to reimage the host computing device 102 with new system firmware 104 in order to update the configuration data 108. This is because the configuration data 108 is not included as part of the system firmware 104. In other words, the configuration data 108 can be stored separately from the system firmware 104. This allows the configuration data 108 to be replaced and/or enhanced with updated configuration data 114 without the need to reimage the host computing device 102 with new system firmware 104.

In some embodiments, each host computing device 102 in a cloud computing system 100 may use the same system firmware image. In other words, the same system firmware 104 may be installed on each host computing device 102 in the cloud computing system 100. Different host computing devices 102 can be configured for different purposes through different configuration data, including the configuration data 108 that is initially installed on the host computing devices 102 as well as updated configuration data 114 that is subsequently provided to the host computing devices 102.

In some embodiments, the updated configuration data 114 may be stored in a different location than the configuration data 108. For example, the updated configuration data 114 may be stored in a different directory, a different data structure, a different memory chip, a different host computing device, a different server, or any other different location from the configuration data 108.

In some embodiments, the management subsystem 112 may be in communication with the system firmware 104 through a wired connection, through a wireless connection, over the Internet, through any other communication mechanism, and combinations thereof. In some embodiments, the system firmware 104 may communicate with the management subsystem 112 over an encrypted connection. This may help to prevent security breaches that may result in malicious software installed on the host computing device 102 or other security breaches.

Figure 2:
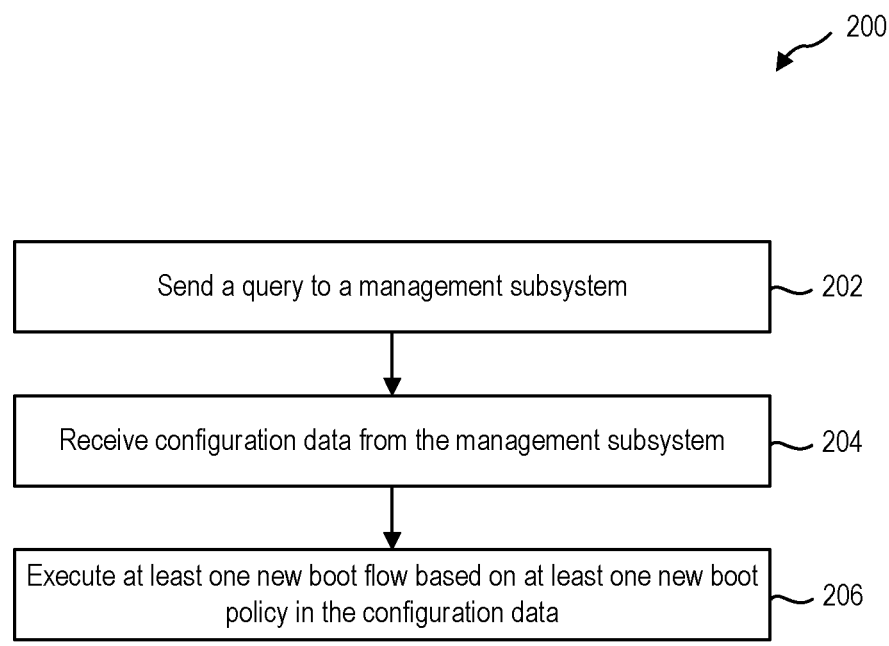
FIG. 2 illustrates an example of a method for efficiently updating configuration data utilized by a host computing device in accordance with the present disclosure.

FIG. 2 illustrates an example of a method 200 for efficiently updating configuration data 108 utilized by a host computing device 102 in accordance with the present disclosure. The method 200 will be described in relation to the cloud computing system 100 shown in FIG. 1. The method 200 can be implemented during a boot cycle in which the boot instructions 106 within the system firmware 104 boot the host computing device 102. The method 200 can be performed by the boot instructions 106 shown in FIG. 1.

The host computing device 102 includes a first set of configuration data 108 that is designed to configure the host computing device 102 for a first type of configuration. In accordance with the method 200, the boot instructions 106 begin a boot cycle of the host computing device 102. This can include initializing hardware on the host computing device 102 and running other boot flows used to boot the host computing device 102 in the first type of configuration. In some embodiments, during the boot cycle the boot instructions 106 may send 202 a query to the management subsystem 112. The query may include a request for any updates to the configuration data 108 of the host computing device 102.

In some embodiments, the boot instructions 106 may send 202 a query to the management subsystem 112 during every boot cycle of the host computing device 102. In some embodiments, the boot instructions 106 may send 202 a query to the management subsystem 112 at periodic intervals, such as if a specified amount of time has passed since the last boot (e.g., an hour, day, week, month, year, or longer) or if the virtual machine has undergone a specified number of boots (e.g., N boots, where N may be any positive integer). In some embodiments, the boot instructions 106 may send 202 a query to the management subsystem 112 at any periodic interval.

In some embodiments, the boot instructions 106 may send 202 a query to the management subsystem 112 at episodic intervals, such as if a triggering event occurred. In some embodiments, a triggering event may be a power interruption to the host computing device 102 of longer than a specified period of time (e.g., seconds, minutes, hours, days, weeks, months, years). In some embodiments, the triggering event may be a hardware replacement. For example, the boot instructions 106 could, while booting the host computing device 102, take inventory of connected hardware and compare the connected hardware to a hardware database. In some embodiments, the triggering event may be a communication from the management subsystem 112 indicating that new management configurations may be available. In some embodiments, the triggering event may be any triggering event that causes the boot instructions 106 to send 202 a query to the management subsystem 112.

In some embodiments, the boot instructions 106 may send 202 a query to the management subsystem 112 with a combination of periodic and episodic intervals. For example, the boot instructions 106 may send 202 a query to the management subsystem 112 if it has been longer than a first period of time (e.g., one week) since the last boot and there was a power interruption to the host computing device 102 of longer than a second period of time (e.g., one hour). It should be understood that any combination of periodic and episodic intervals may be used.

In accordance with the method 200, the management subsystem 112 may transmit and the boot instructions 106 may receive 204 updated configuration data 114. The updated configuration data 114 may be designed to configure the host computing device 102 for a second type of configuration. The updated configuration data may include at least one new boot policy 116 that is not included in the configuration data 108 that is already stored on the host computing device 102.

In some embodiments, the management subsystem 112 may transmit the boot instructions 106 based on or in response to the query. In some embodiments, the management subsystem 112 may transmit the boot instructions 106 when it detects that the boot instructions 106 have begun booting the host computing device 102. For example, the management subsystem 112 may sense that power has been connected to the host computing device 102. Based on or in response to sensing that power has been connected to the host computing device 102, the management subsystem 112 may transmit the configuration data 108 to the boot instructions 106.

The boot instructions 106 may receive 204 the updated configuration data 114. In some embodiments, the boot instructions 106 may execute 206 at least one new boot flow during the boot cycle. The at least one new boot flow may be based on the at least one new boot policy 116 in the updated configuration data 114. In some embodiments, the boot instructions 106 may create the at least one new boot flow based on the at least one new boot policy.

Executing 206 the at least one new boot flow during the boot cycle may cause the host computing device 102 to be configured in the second type of configuration. Thus, the host computing device 102 may change configurations without reimaging the entire host computing device 102. This may increase the speed with which a system administrator may repurpose a host computing device 102.

Figure 3:
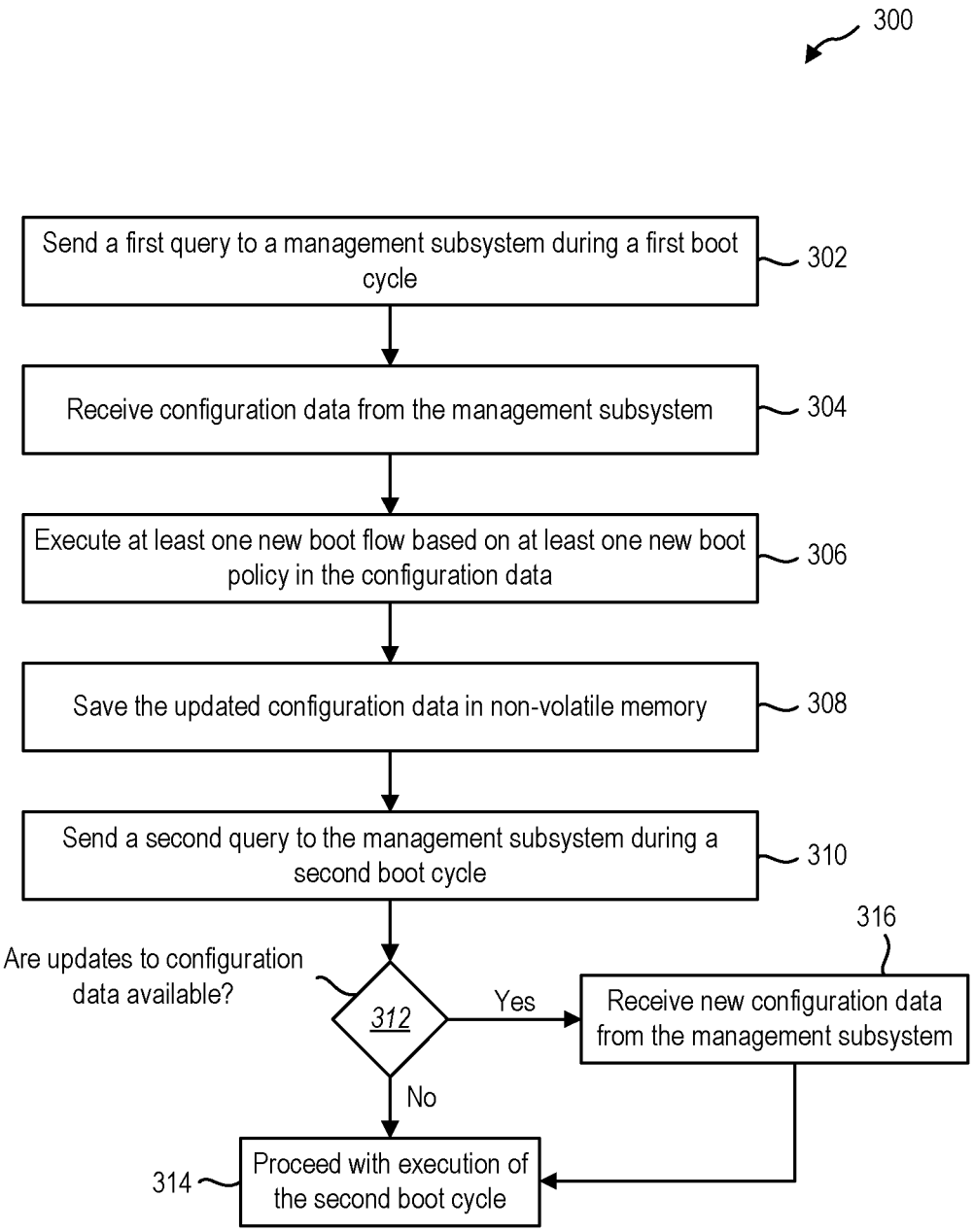
FIG. 3 illustrates an example of a method in which boot instructions within system firmware boots a host computing device.

FIG. 3 illustrates an example of a method 300 in which boot instructions 106 within system firmware 104 boots a host computing device 102. The host computing device 102 includes a first set of configuration data 108 that is designed to configure the host computing device 102 for a first type of configuration. The method 300 will be described in relation to the system 100 shown in FIG. 1. The method 300 may be performed by the boot instructions 106 shown in FIG. 1.

In accordance with the method 300, the boot instructions 106 may begin a first boot cycle of the host computing device 102. The boot instructions 106 may send 302 a first query to a management subsystem 112. The first query may include a request for updates to the configuration data 108 on the host computing device 102.

In response to the first query, the management subsystem 112 may transmit, and the boot instructions 106 may receive 304, updated configuration data 114 from the management subsystem during the first boot cycle. The updated configuration data 114 may be designed to configure the host computing device 102 for a second configuration. The updated configuration data 114 may include at least one new boot policy 116 that is not included in the configuration data 108 of the host computing device.

During the first boot cycle, the boot instructions 106 may execute 306 at least one new boot flow associated with the second type of configuration. The at least one new boot flow may be based on the at least one new boot policy 116 received in the updated configuration data 114.

In some embodiments, the boot instructions 106 may save 308 the updated configuration data 114 in non-volatile memory (NVRAM). This may allow the updated configuration data 114 to be accessed by the system firmware 104 on subsequent boot cycles after the first boot cycle (e.g., after the power supply to the host computing device has been interrupted).

After the first boot cycle is completed, the boot instructions may execute a second boot cycle on the host computing device 102. During the second boot cycle, the boot instructions may send 310 a second query to the management subsystem 112. The second query may request any updates to the updated configuration data 114. The boot instructions 106 may determine 312 whether there are updates to the updated configuration data 314 available. If updates are not available, then the boot instructions 106 may proceed 314 with the execution of the second boot cycle using the updated configuration data 114 and without receiving any new configuration data from the management subsystem 112.

If updates are available, then the management subsystem 112 may send, and the boot instructions 106 may receive 316, the new configuration data during the second boot cycle. The new configuration data may include at least one additional boot policy that is not included in the configuration data 108 or the updated configuration data 114. In this manner, the system administrator may repeatedly repurpose the host computing device 102 quickly and seamlessly, without reimaging the entire host computing device 102.

Figure 4:
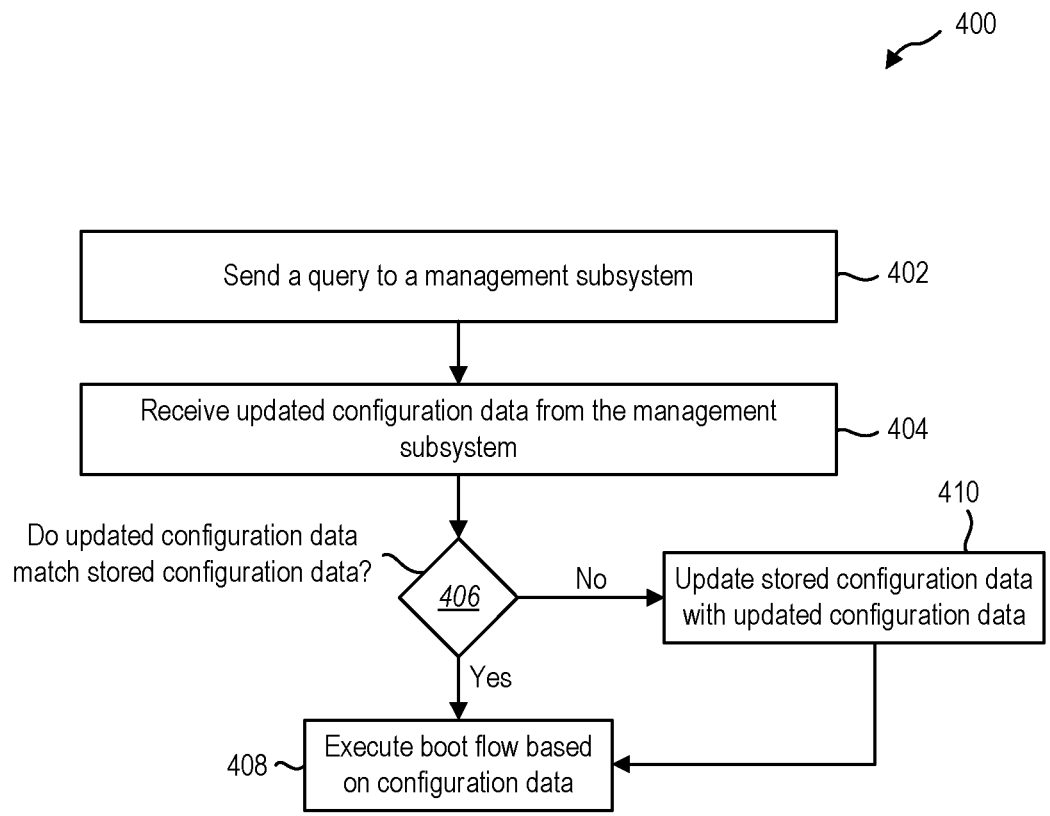
FIG. 4 illustrates another example of a method for efficiently updating configuration data utilized by a host computing device, in which a determination is made about whether stored configuration data on the host computing device matches updated configuration data received from a management subsystem.

FIG. 4 illustrates an example of a method 400 in which system firmware 104 including boot instructions 106 boots a host computing device 102. The host computing device 102 includes stored configuration data 108 that is designed to configure the host computing device 102 for a first type of configuration. The method 400 will be described in relation to the system 100 shown in FIG. 1. The method 400 may be performed by the boot instructions 106 shown in FIG. 1.

In accordance with the method 400, the boot instructions 106 may execute a boot cycle of the host computing device 102. During the boot cycle, the boot instructions 106 may send 402 a query to the management subsystem 112 for any updated configuration data 114. The management subsystem 112 may send the configuration data 108 to the boot instructions 106. The boot instructions 106 may then receive 404 the updated configuration data 114.

In some embodiments, the boot instructions 106 determine 406 whether the stored configuration data 108 on the host computing device 102 matches the updated configuration data 114 received from the management subsystem 112. For example, the boot instructions 106 may compare the stored configuration data 108 to the updated configuration data 114. In some embodiments, the boot instructions 106 may compare each element of the updated configuration data 114 to its respective stored configuration data 108 (if any). If the stored configuration data 108 match the updated configuration data 114, then the boot instructions 106 may execute 408 the boot flows determined by the stored boot policies 110 of the host computing device without any modification.

If the stored configuration data 108 do not match the updated configuration data 114, then the boot instructions 106 may update 410 the stored configuration data 108 with the updated configuration data 114. In some embodiments, the update 410 of the updated configuration data 114 may be a patch. In other words, the update 410 may replace only the relevant portion of the stored configuration data 108 with the updated configuration data 114. In some embodiments, the update 410 may only replace the relevant portion of the stored configuration data 108 without replacing any other portion of the stored configuration data 108. In some embodiments, the update 410 may completely replace all the stored configuration data 108 with the updated configuration data 114.

In some embodiments, the updated configuration data 114 may include instructions that indicate that no updates to the stored configuration data 108 are needed. In other words, rather than include and compare the entire list of configuration data, the updated configuration data 114 may include instructions indicating that the stored configuration data 108 is sufficient and/or up to date. In some embodiments, the updated configuration data 114 may include instructions indicating that some boot policies 110 are to be updated with new boot policies 116 and that other boot policies 110 are not to be changed.

Figure 5:
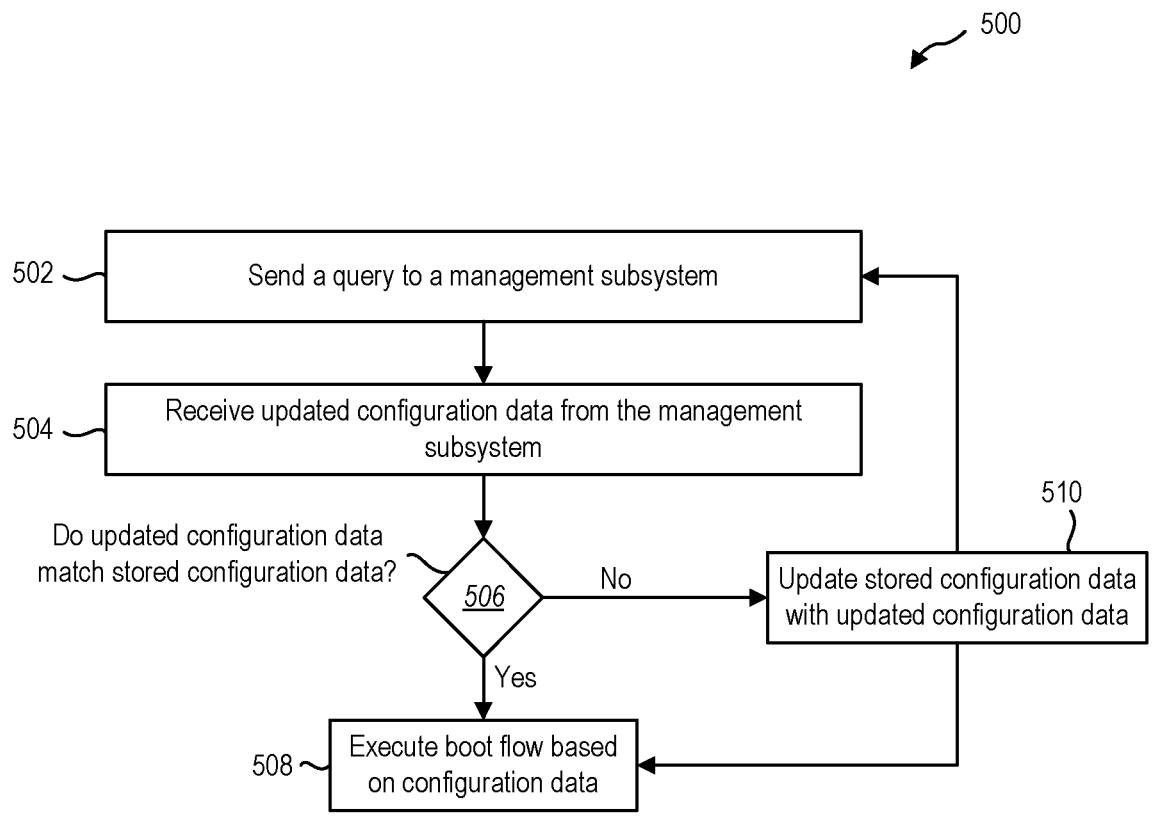
FIG. 5 illustrates another example of a method for efficiently updating configuration data utilized by a host computing device, in which another query is sent to a management subsystem following the receipt of updated configuration data.

FIG. 5 illustrates an example of a method 500 in which system firmware 104 including boot instructions 106 boots a host computing device 102. The host computing device 102 includes a first set of configuration data 108 that is designed to configure the host computing device 102 for a first type of configuration. The method 500 will be described in relation to the system 100 shown in FIG. 1. The method 500 may be performed by the boot instructions 106 shown in FIG. 1.

According to the method 500, the boot instructions 106 may begin a boot cycle for the host computing device 102. The boot instructions 106 may send 502 a query to the management subsystem 112 for updated configuration data 114. The management subsystem 112 may send the updated configuration data 114 to the boot instructions 106 and the boot instructions 106 may receive 504 the updated configuration data 114. In some embodiments, the boot instructions 106 may determine 506 whether the stored configuration data 108 of the host computing device 102 match the updated configuration data 114. If the stored configuration data 108 match the updated configuration data 114, then the boot instructions 106 may execute a boot flow determined by the stored configuration data 108 to boot the host computing device 102.

If the stored configuration data 108 do not match the updated configuration data 114, then the boot instructions 106 may update 510 the stored configuration data 108 with the updated configuration data 114. After the stored configuration data 108 is updated, the boot instructions 106 may send 502 a query to the management subsystem 112 for the updated configuration data 114 again. The acts described above may then be repeated until the stored (and updated) configuration data 108 match the updated configuration data 114. In some embodiments, the loop of sending 502 a query to the management subsystem 112 and updating the stored configuration data 108 may be repeated a single time. In some embodiments, each loop may update a different element of the configuration data 108. In some embodiments, the boot instructions 106 may send 502 a query to the management subsystem 112 after updating 510 the stored configuration data 108 as an error-checking mechanism. This may help to reduce the chance of the boot instructions 106 using erroneous configuration settings while booting the host computing device 102. This may improve the consistent and reliability of the cloud computing system.

Figure 6:
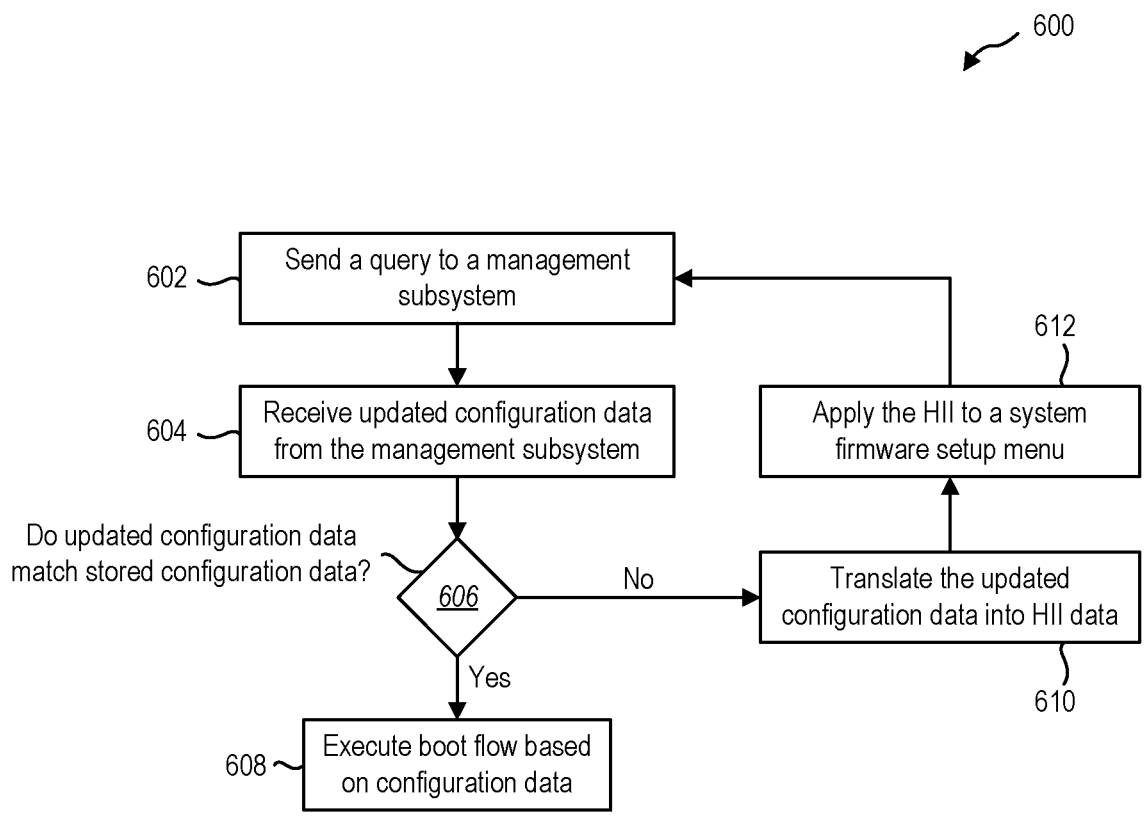
FIG. 6 illustrates another example of a method for efficiently updating configuration data utilized by a host computing device, in which the boot instructions translate the configuration data into a Human Interface Infrastructure (HII) data format.

FIG. 6 illustrates an example of a method 600 in which system firmware 104 including boot instructions 106 boots a host computing device 102. The host computing device 102 includes a first set of configuration data 108 that is designed to configure the host computing device 102 for a first type of configuration. The method 600 will be described in relation to the system 100 shown in FIG. 1. The method 600 may be performed by the boot instructions 106 shown in FIG. 1.

In accordance with the method 600, the boot instructions 106 may begin a first boot cycle to boot the host computing device 102. The boot instructions 106 may send 602 a query to the management subsystem 112 for updated configuration data 114, which the management subsystem 112 transmits to the boot instructions 106 and the boot instructions 106 receive 604. The boot instructions 106 may determine 606 if the stored configuration data 108 match the updated configuration data 114. If the respective configuration settings match, then the boot instructions 106 may execute a boot flow based on the stored configuration data 108 to boot the host computing device 102.

If the stored configuration data 108 do not match the updated configuration data 114, then the boot instructions 106 may update 610 the stored configuration data 108. In the embodiment shown, the updated configuration data 114 are transmitted to the boot instructions 106 in a first format (e.g., as raw byte stream, JSON data, BIOS data, EUFI data, or other format). The boot instructions 106 may receive 604 the updated configuration data 114 in the first format and convert the updated configuration data 114 to a second format. In some embodiments, the second format may be configured for upload to a user-accessible database. For example, the boot instructions 106 may translate 610 the configuration data 108 into a Human Interface Infrastructure (HII) data format. The boot instructions 106 may then apply the HII data format (containing the updated configuration data 114) and apply it to a system firmware setup menu.

A system administrator may be able to access the configuration data saved on the HII database. In this manner, the system administrator may check the configuration data of the host computing device 102 to determine the configuration of the host computing device 102. In some embodiments, the boot instructions 106 may save the configuration data 108 in non-volatile memory. For example, the boot instructions 106 may save the updated configuration data 114 to the HII database in non-volatile RAM (NVRAM). In this manner, when power to the host computing device 102 is interrupted, the updated configuration data 114 may be accessed after power is restored.

In some embodiments, the boot instructions 106 may save the updated configuration data 114 in addition to the existing configuration data 108. In this manner, multiple configuration data settings may be accessible by the boot instructions 106. This may allow the management subsystem 112 to point to which combination of configuration data the boot instructions 106 may use to configure the host computing device 102. This may also allow a system administrator, by accessing the HII database, to review in which ways the virtual machine has been configured.

Figure 7:
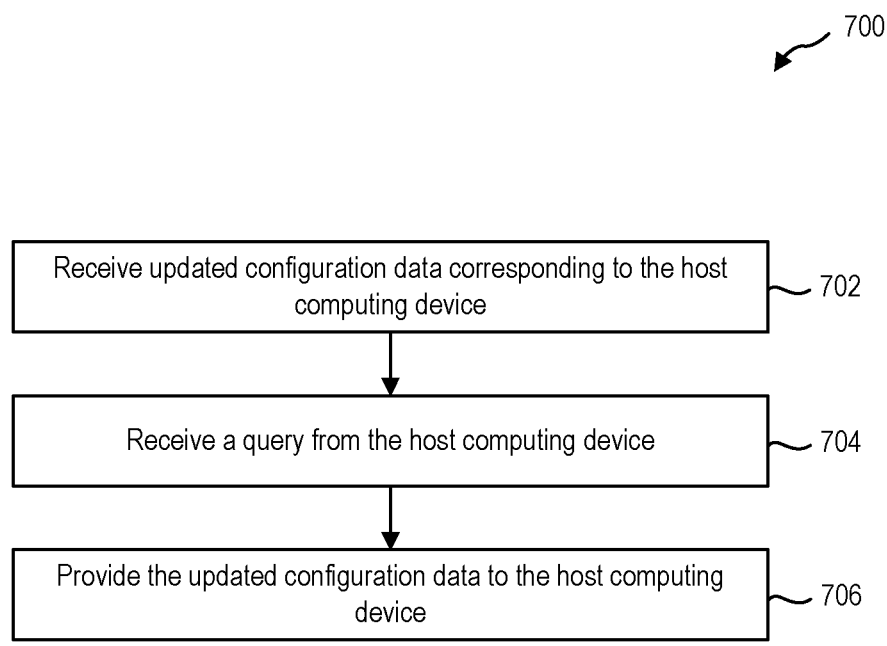
FIG. 7 illustrates an example of a method that can be performed by a management subsystem for efficiently updating configuration data utilized by a host computing device.

FIG. 7 illustrates a representation of a method 700 in which a management subsystem 112 provides updated configuration data 114 to a host computing device 102 for efficient updating of configuration data 108 utilized by a host computing device 102 during a boot process. The method 700 will be described in relation to the system 100 shown in FIG. 1. The method 700 may be performed by the management subsystem 112 shown in FIG. 1.

The management subsystem 112 may receive 702 updated configuration data 114 corresponding to the host computing device 102 from a system administrator. The system administrator may send the updated configuration data 114 in any file format readable by the management subsystem 112. For example, the system administrator may send the updated configuration data 114 in a JavaScript Object Notation (JSON) file format. In some examples, the system administrator may send the updated configuration data 114 using any other file format, including YAML, XML, BSON, CBOR, or any other file format.

The management subsystem 112 may store the updated configuration data 114. For example, the management subsystem 112 may store the updated configuration data 114 in electrically erasable programmable ROM (EEPROM). In this manner, the system administrator may send the updated configuration data 114 to the management subsystem 112 at any time. This may allow the management subsystem 112 to provide 706 the updated configuration data 114 as soon as it receives 704 a query from the host computing device 102. In some embodiments, the management subsystem 112 may query the system administrator for the updated configuration data 114 when it receives 704 the query from the host computing device.

The management subsystem 112 may receive 704 the query from the host computing device during a boot cycle of the host computing device. The query may include a request for any updates to the configuration data 108 being utilized by the system firmware of the host computing device.

After receiving 704 the query from the host computing device, the management subsystem 112 may provide 706 the updated configuration data 114 to the host computing device 102 during the boot cycle. The updated configuration data 114 may be designed to configure the host computing device for a second type of configuration. The updated configuration data may include at least one new boot policy that is not included in the configuration data 108. The host computing device 108 may then use the updated configuration data 114 to boot the host computing device 102.

In some embodiments, the management subsystem 112 may receive a second query from the host computing device 102 during a second boot cycle for the host computing device 102 that is subsequent (e.g., after) the first boot cycle. The second query may request any additional updates to the updated configuration data 114 previously transmitted to the host computing device 102 during the first boot cycle. If there are updates to the updated configuration data 114, the management subsystem 112 may provide the new configuration data to the host computing device 102, which may use the new configuration data during the second boot cycle. If there are no updates to the updated configuration data 114, the host computing device 102 may proceed with the second boot cycle using the updated configuration data 114.

Figure 8:
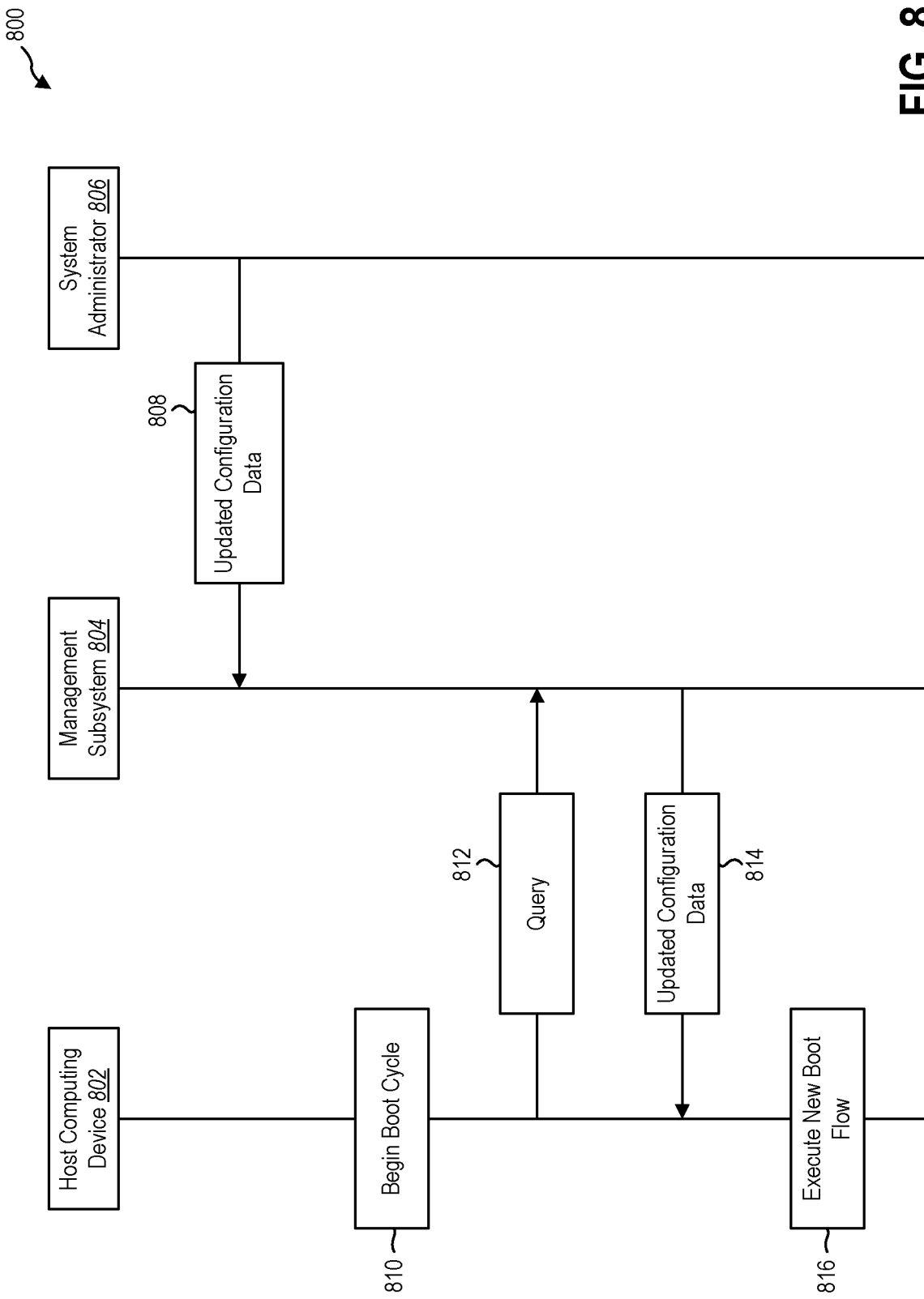
FIG. 8 illustrates potential interactions between a host computing device, a management subsystem, and a system administrator according to at least one embodiment of the present disclosure.

FIG. 8 illustrates potential interactions between a host computing device 802, a management subsystem 804, and a system administrator 806 according to at least one embodiment of the present disclosure. In the computing system 800 shown in FIG. 8, the management subsystem 804 and the system administrator 806 are in electronic communication with the host computing device 802. In some embodiments, the system administrator 806 may be a program that provides instructions to management subsystems 804 regarding management of virtual machines, host computing devices 802, servers, or other network management tasks. In some examples, the system administrator 806 may be a human system administrator that manually enters instructions and/or data into the network interface.

In some embodiments, the system administrator 806 may desire to repurpose the host computing device 802 between different types of configurations. In some embodiments, the host computing device 802 may be a new host computing device (e.g., newly formed, newly designated, on a new host computing device, on a new server) and the system administrator 806 may be creating configuration data associated with the first configuration type of the host computing device 802.

The system administrator 806 may communicate updated configuration data 808 to the management subsystem 804. As discussed herein, the updated configuration data 808 may include any configuration data 808 used to boot a host computing device. For example, the updated configuration data 808 may include specific boot policies from which boot flows are determined, the boot flows being executable by system firmware on the host computing device 802. The boot flows are designed to configure the host computing device 802 for a specific type of configuration.

In some embodiments, the system administrator 806 may update the management subsystem 804 before system firmware (e.g., BIOS, UEFI, or other boot instructions) on the host computing device 802 begins 810 a boot cycle. Thus, at boot time, the management subsystem 804 may be ready to send the updated configuration data 808 as soon as it receives the query 814 from the host computing device 802.

In some embodiments, communications between two or more of the host computing device 802, the management subsystem 804, and the system administrator 806 may be secure communications. In other words, any communication between two or more of the host computing device 802, the management subsystem 804, and the system administrator 806 may be encrypted over encrypted communication channels. This may help to ensure that no malicious software, spyware, malware, trojan horses, virus, or other malicious cyber-attack is installed on the virtual machine at boot time.

In some embodiments, the system administrator 806 may review the configuration data of the host computing device 802. The system administrator 806 may identify the existing (or default) configuration in the system firmware, and may determine whether the host computing device 802 needs to be repurposed. If the system administrator 806 determines that the host computing device 802 needs to be repurposed, and/or if the system administrator 806 determines that any portion of the configuration data need to be changed, the system administrator 806 may transmit the updated configuration data 808 to the management subsystem 804.

In some embodiments, after a review of the configuration data, the system administrator 806 may determine that the configuration data need to be updated. In this case, the system administrator 806 may include instructions in the updated configuration data 808 that instruct the management subsystem 804 and/or the boot instructions to replace one or more boot configuration settings with the management configuration settings.

After beginning 810 a boot of the host computing device 802, the boot instructions may query 812 the management subsystem 804 for the updated configuration data 808. The management subsystem 804 may send the updated configuration data 814 to the host computing device 802. The host computing device may then execute 816 a new boot flow based on the updated configuration data.

Figure 9:
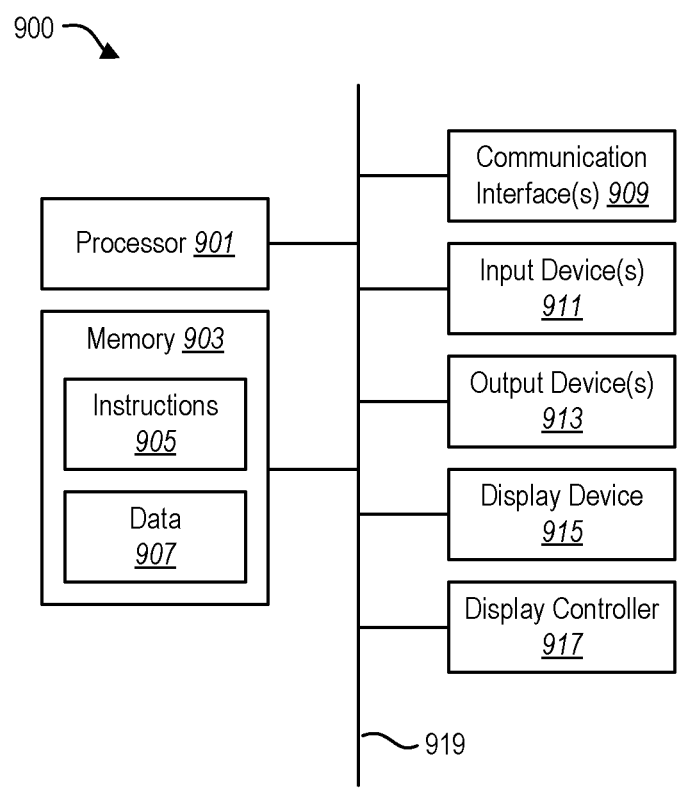
FIG. 9 illustrates certain components that can be included within a computing device.

Reference is now made to FIG. 9. One or more computing devices 900 can be used to implement at least some aspects of the techniques disclosed herein. FIG. 9 illustrates certain components that can be included within a computing device 900. The computing device 900 shown in FIG. 9 is an example of the host computing device 102 shown in FIG. 1.

The computing device 900 includes a processor 901 and memory 903 in electronic communication with the processor 901. Instructions 905 and data 907 can be stored in the memory 903. The instructions 905 can be executable by the processor 901 to implement some or all of the methods, steps, operations, actions, or other functionality that is disclosed herein. Executing the instructions 905 can involve the use of the data 907 that is stored in the memory 903. Unless otherwise specified, any of the various examples of modules and components described herein can be implemented, partially or wholly, as instructions 905 stored in memory 903 and executed by the processor 901. Any of the various examples of data described herein can be among the data 907 that is stored in memory 903 and used during execution of the instructions 905 by the processor 901.

Although just a single processor 901 is shown in the computing device 900 of FIG. 9, in an alternative configuration, a combination of processors (e.g., an ARM and DSP) could be used.

The computing device 900 can also include one or more communication interfaces 909 for communicating with other electronic devices. The communication interface(s) 909 can be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 900 can also include one or more input devices 911 and one or more output devices 913. Some examples of input devices 911 include a keyboard, mouse, microphone, remote control device, button, joystick, trackball, touchpad, and lightpen. One specific type of output device 913 that is typically included in a computing device 900 is a display device 915. Display devices 915 used with embodiments disclosed herein can utilize any suitable image projection technology, such as liquid crystal display (LCD), light-emitting diode (LED), gas plasma, electroluminescence, or the like. A display controller 917 can also be provided, for converting data 907 stored in the memory 903 into text, graphics, and/or moving images (as appropriate) shown on the display device 915. The computing device 900 can also include other types of output devices 913, such as a speaker, a printer, etc.

The various components of the computing device 900 can be coupled together by one or more buses, which can include a power bus, a control signal bus, a status signal bus, a data bus, etc. For the sake of clarity, the various buses are illustrated in FIG. 9 as a bus system 919.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

As an example, the term "circuitry" can refer to one or more integrated circuits, where an integrated circuit can include a set of electronic circuits on a piece of semiconductor material (e.g., silicon). In some embodiments, circuitry can include programmable logic devices such as field programmable gate arrays (FPGAs) and/or complex programmable logic devices (CPLDs). In some embodiments, circuitry can include application specific integrated circuits (ASICs). As another example, the term "circuitry" can refer to one or more discrete electronic circuits that include individual electronic components. As another example, the term "circuitry" can refer to a digital circuit, an analog circuit, or a mixed-signal circuit. "Circuitry" can also include combinations of the foregoing.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for efficiently updating configuration data utilized by a host computing device during a boot cycle, comprising:
    one or more processors;
    memory in electronic communication with the one or more processors;
    first configuration data stored in the memory, wherein the first configuration data is designed to configure the host computing device for a first device configuration;
    system firmware stored in the memory, wherein the system firmware comprises boot instructions that utilize the first configuration data, and wherein the boot instructions are executable by the one or more processors to:
        send a first query to a management subsystem during a first boot cycle of the host computing device, wherein the first query requests any updates to the first configuration data;
        receive second configuration data from the management subsystem during the first boot cycle, wherein the second configuration data is designed to configure the host computing device for a second device configuration, and wherein the second configuration data comprises at least one new boot policy that is not included in the first configuration data; and
        execute at least one new boot flow during the first boot cycle, wherein the at least one new boot flow is associated with the second device configuration, and wherein the at least one new boot flow is based on the at least one new boot policy in the second configuration data.

2. The system of claim 1, wherein:
    the host computing device is part of a cloud computing system that is operated by a cloud computing provider;
    the first device configuration is associated with a first virtual machine (VM) profile offered by the cloud computing provider;
    the second device configuration is associated with a second VM profile offered by the cloud computing provider; and
    the second VM profile is different from the first VM profile.

3. The system of claim 1, wherein:
    the host computing device further comprises non-volatile memory; and
    the boot instructions are additionally executable by the one or more processors to save the second configuration data in the non-volatile memory.

4. The system of claim 3, wherein the boot instructions are additionally executable by the one or more processors to:
    send a second query to the management subsystem during a second boot cycle of the host computing device, wherein the second boot cycle occurs subsequent to the first boot cycle, and wherein the second query requests any updates to the second configuration data;
    determine, based at least in part on information received from the management subsystem and the second configuration data stored in the non-volatile memory, that no updates to the second configuration data are available from the management subsystem; and
    proceed with execution of the second boot cycle without obtaining any new configuration data from the management subsystem.

5. The system of claim 3, wherein the boot instructions are additionally executable by the one or more processors to:
    send a second query to the management subsystem during a second boot cycle of the host computing device, wherein the second boot cycle occurs subsequent to the first boot cycle, and wherein the second query requests any updates to the second configuration data;
    determine, based at least in part on information received from the management subsystem and the second configuration data stored in the non-volatile memory, that new configuration data is available from the management subsystem; and
    receive the new configuration data from the management subsystem during the second boot cycle, wherein the new configuration data comprises an additional boot policy that is not included in the first configuration data or the second configuration data.

6. The system of claim 1, wherein the management subsystem comprises a management controller that is included within the host computing device.

7. The system of claim 1, wherein the management subsystem comprises at least one server that is separate from the host computing device and in electronic communication with the host computing device.

8. The system of claim 1, wherein the boot instructions are additionally executable by the one or more processors to:
    translate the second configuration data into human interface infrastructure (HII) data; and
    apply the HII data to a system firmware setup menu.

9. A management subsystem that facilitates efficient updating of configuration data utilized by a host computing device during a boot process, comprising:
    one or more processors;
    memory in electronic communication with the one or more processors;
    instructions that are stored in the memory and executable by the one or more processors to:

receive updated configuration data corresponding to the host computing device;

receive a first query from the host computing device during a first boot cycle of the host computing device, wherein the first query requests any updates to the configuration data being utilized by system firmware of the host computing device, wherein the configuration data is designed to configure the host computing device for a first device configuration; and provide the updated configuration data to the host computing device in response to the first query, wherein the management subsystem provides the updated configuration data to the host computing device during the first boot cycle, wherein the updated configuration data is designed to configure the host computing device for a second device configuration, and wherein the updated configuration data comprises at least one new boot policy that is not included in the configuration data being utilized by the system firmware of the host computing device.

10. The management subsystem of claim 9, wherein:
the host computing device is part of a cloud computing system that is operated by a cloud computing provider;
the first device configuration is associated with a first virtual machine (VM) profile offered by the cloud computing provider;
the second device configuration is associated with a second VM profile offered by the cloud computing provider; and
the second VM profile is different from the first VM profile.

11. The management subsystem of claim 9, wherein:
the host computing device is part of a cloud computing system; and
the updated configuration data is received from a system administrator associated with the cloud computing system.

12. The management subsystem of claim 9, wherein the instructions are additionally executable by the one or more processors to:
receive a second query from the host computing device during a second boot cycle of the host computing device, wherein the second boot cycle occurs subsequent to the first boot cycle, and wherein the second query requests any additional updates to the updated configuration data; and
provide information to the host computing device indicating that no new configuration data is available from the management subsystem, wherein the host computing device proceeds with execution of the second boot cycle without obtaining any new configuration data from the management subsystem.

13. The management subsystem of claim 9, wherein the instructions are additionally executable by the one or more processors to:
receive additional updated configuration data corresponding to the host computing device;
receive a second query from the host computing device during a second boot cycle of the host computing device, wherein the second boot cycle occurs subsequent to the first boot cycle, and wherein the second query requests any additional updates to the updated configuration data; and
provide new configuration data to the host computing device in response to the second query, wherein the management subsystem provides the new configuration data to the host computing device during the second boot cycle, and wherein the new configuration data comprises an additional boot policy that is not included in the configuration data or the updated configuration data.

14. The management subsystem of claim 9, wherein the management subsystem comprises a management controller that is included within the host computing device.

15. The management subsystem of claim 9, wherein the management subsystem comprises at least one server that is separate from the host computing device and in electronic communication with the host computing device.

16. A method for efficiently updating configuration data utilized by a host computing device during a boot process, the method being implemented by boot instructions within system firmware of the host computing device, the method comprising:
sending a first query to a management subsystem during a first boot cycle of the host computing device, wherein the configuration data is designed to configure the host computing device for a first device configuration, and wherein the first query requests any updates to the configuration data;
receiving updated configuration data from the management subsystem during the first boot cycle, wherein the updated configuration data is designed to configure the host computing device for a second device configuration, and wherein the updated configuration data comprises at least one new boot policy that is not included in the configuration data; and
executing at least one new boot flow during the first boot cycle, wherein the at least one new boot flow is associated with the second device configuration, and wherein the at least one new boot flow is based on the at least one new boot policy in the updated configuration data.

17. The method of claim 16, wherein:
the host computing device is part of a cloud computing system that is operated by a cloud computing provider;
the first device configuration is associated with a first virtual machine (VM) profile offered by the cloud computing provider;
the second device configuration is associated with a second VM profile offered by the cloud computing provider; and
the second VM profile is different from the first VM profile.

18. The method of claim 16, further comprising saving the updated configuration data in non-volatile memory of the host computing device.

19. The method of claim 18, further comprising:
sending a second query to the management subsystem during a second boot cycle of the host computing device, wherein the second boot cycle occurs subsequent to the first boot cycle, and wherein the second query requests any additional updates to the configuration data;
determining, based at least in part on information received from the management subsystem and the updated configuration data stored in the non-volatile memory, that no additional updates to the configuration data are available from the management subsystem; and
proceeding with execution of the second boot cycle without obtaining any new configuration data from the management subsystem.

20. The method of claim 18, further comprising:
sending a second query to the management subsystem during a second boot cycle of the host computing device, wherein the second boot cycle occurs subsequent to the first boot cycle, and wherein the second query requests any additional updates to the configuration data;
determining, based at least in part on information received from the management subsystem and the updated configuration data stored in the non-volatile memory, that an additional update to the configuration data is available from the management subsystem; and
receiving the additional update to the configuration data from the management subsystem during the second boot cycle, wherein the additional update to the configuration data comprises an additional boot policy that is not included in the configuration data or the updated configuration data.

* * * * *